Patented Jan. 20, 1953

2,626,281

UNITED STATES PATENT OFFICE 2,626,281

DECOMPOSITION OF ARALKYL ALPHA-HYDROPEROXIDES

George G. Joris, Convent, N. J., assignor to Allied Chemical & Dye Corporation, New York, N. Y., a corporation of New York No Drawing. Application August 23, 1949, Serial No. 111,980

7 Claims. (Cl. 260—593)

This invention relates to decomposition of aralkyl alpha-hydroperoxides.

In the description which follows, my invention will be illustrated with particular reference to cumene hydroperoxide; but it is not so limited and applies in general to aralkyl alpha-hydroperoxides such as ethyl benzene alpha-hydroperoxide; isopropyl toluene alpha-hydroperoxide; and alpha-hydroperoxides of diisopropyl benzenes; isopropyl and diisopropyl naphthalenes; isopropyl, methyl isopropyl, and diisopropyl diphenyls, etc.; i. e. my invention applies to hydroperoxides of the general formula

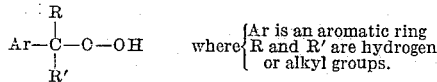

where Ar is an aromatic ring, R and R' are hydrogen or alkyl groups.

Preferred hydroperoxides decomposed in accordance with the invention are hydroperoxides of mono- and diisopropyl benzenes and toluenes, which decompose smoothly to the corresponding phenol plus acetone.

It is known that cumene alpha-hydroperoxide decomposes to phenol and acetone under the influence of strong inorganic acid such as hydrochloric, sulfuric, perchloric, etc. The stronger the acid of the above type, the more efficient it is in decomposing cumene hydroperoxide to phenol and acetone in theoretical yields.

I have now found that aralkyl alpha-hydroperoxides such as cumene alpha-hydroperoxide are decomposed extraordinarily smoothly, rapidly and efficiently to the corresponding hydroxy aromatic compound and carbonyl compound upon contacting them with sulfur dioxide.

The hydroperoxide decomposed in accordance with my process need not be a pure material. For example, the crude reaction product of cumene oxidation to cumene hydroperoxide may be used. Such a reaction product will contain say 30–60% of cumene hydroperoxide, cumene, and a little acetophenone and dimethyl phenyl carbinol. The crude reaction product may also contain catalysts, conditioning agents and the like, e. g. solid sodium carbonate, suspended therein in finely divided form. Inert and extraneous materials do not prevent decomposition by sulfur dioxide of hydroperoxides. In fact, a particular advantage of use of sulfur dioxide is that the sulfur dioxide causes rapid separation of any finely divided suspended sodium carbonate present in cumene hydroperoxide which is subjected to sulfur dioxide-catalyzed decomposition.

The sulfur dioxide employed as decomposition catalyst in accordance with my process is ordinarily introduced into the reaction mixture in the form of a gas admixed with a suitable inert carrier gas, e. g. air or sulfur burner gases. Inasmuch as the merest traces of sulfur dioxide are sufficient to exert decomposing action, and since adventitious water is usually present in the reaction mixture, the sulfur dioxide catalyst will ordinarily be present in the reaction mixture in the form of aqueous sulfurous acid. Thus when I refer to sulfur dioxide herein, I intend to include the gas itself and sulfur dioxide in the form of aqueous sulfurous acid. The sulfur dioxide or sulfurous acid ordinarily dissolves in the reaction mixture and thus offers the advantage of being readily dispersed therein.

The following examples are illustrative of my invention, but are not to be interpreted in a limiting sense.

*Example 1.*—Reaction products containing about 45 weight percent of cumene hydroperoxide, freed from catalyst powders by filtration, were added slowly to a reaction medium of decomposition products and inerts from previous operations, and a stream of air containing sulfur dioxide was bubbled into the reaction mixture at the same time. The reaction mixture was mechanically stirred and was cooled by a water bath maintained at 15° C. The rate of addition of crude cumene hydroperoxide was regulated to maintain the temperature of the reaction mixture at about 30° C.; and the rate of introduction of sulfur dioxide was regulated to provide 5 parts of sulfur dioxide by weight per million parts of reaction mixture. Under these conditions the decomposition proceeded smoothly to give substantially the theoretical yields of phenol and acetone based on cumene hydroperoxide introduced.

*Example 2.*—Using a similar crude cumene hydroperoxide freed of suspended catalyst powder by extraction thereof with hot water, temperatures in the reaction mixture of about 60° C., amounts of sulfur dioxide of about 420 parts by weight per million parts of reaction mixture, and rate of flow of reaction mixture through the decomposer giving a hold-up time of 90 minutes, the concentration of undecomposed cumene hydroperoxide leaving the decomposer was less than 0.1 weight percent and the yields of phenol and acetone were 98% of theoretical.

*Example 3.*—When crude cumene hydroperoxide similar to that of the preceding examples but containing about 0.1 weight percent of suspended soda ash was decomposed as in Example 1 but at a temperature of about 60° C. using about 200 parts by weight of sulfur dioxide per million parts of reaction mixture, the finely divided soda ash rapidly settled to the bottom of the decomposer; and the yields of phenol and acetone decomposition products were theoretical based on entering cumene hydroperoxide.

*Example 4.*—Reaction products containing about 48.6 weight percent of diisopropyl benzene mono alpha-hydroperoxide, freed from catalyst by filtration, were added slowly to a reaction medium of decomposition products and inerts from previous operations, and a stream of air containing sulfur dioxide was bubbled into the reaction mixture at the same time. The reaction mixture was maintained at 80 to 90° C., the amount of sulfur dioxide was about 640 parts by weight per million parts of reaction mixture; the hold-up time was about 2.5 hours, the concentration of undecomposed diisopropylbenzene hydroperoxide leaving the decomposer was 1.5 weight percent. Under these conditions the decomposition of diisopropylbenzene hydroperoxide yields practically exclusively isopropyl phenol and acetone.

Stainless steel may be employed as construction material for the decomposer used in my process, since reaction mixtures containing sulfur dioxide such as those above described have little corrosive action on stainless steel.

The quantities of sulfur dioxide employed in my process may be extremely small. Larger quantities than necessary may be used if desired and give more rapid reaction rates or the same reaction rate at lower temperatures; but quantities should be regulated to keep the reaction under control. The quantities ordinarily used range from about 5 parts of sulfur dioxide to about 1000 parts of sulfur dioxide by weight per million parts of reaction mixture. Amounts of sulfur dioxide affording convenient reaction rates at ordinary or moderately elevated temperatures with the crude hydroperoxides ordinarily used are between about 10 parts and about 200 parts by weight per million parts of reaction mixture.

The temperatures ordinarily employed in accordance with my process are from about 30° C. to about 80° C. In general higher temperatures are needed to obtain convenient reaction rates the smaller the quantity of sulfur dioxide employed.

As previously stated, sulfur dioxide may be introduced into the reaction mixture along with a carrier gas. Thus in the above examples, air was bubbled through liquid sulfur dioxide to form a gaseous mixture containing about 2 mols percent of sulfur dioxide. This technique facilitated measuring the requisite small quantities of sulfur dioxide. In large scale operations, where the actual quantities of sulfur dioxide handled are greater, a carrier gas is not needed to facilitate measuring and need not be used. It may still, however, be convenient to employ a mixture of sulfur dioxide and burner gases formed along with the sulfur dioxide when sulfur is burned in air.

I claim:

1. In a process for decomposing an aralkyl alpha-hydroperoxide, the improvement which comprises contacting the hydroperoxide in liquid phase reaction mixture with sulfur dioxide to catalyze the decomposition into a carbonyl compound and a hydroxy aromatic compound.

2. A process for decomposing an aralkyl alpha-hydroperoxide which comprises adding, to a reaction medium of decomposition products and inerts from previous operation of said decomposition process, said hydroperoxide and sulfur dioxide gas in a carrier gas in amounts between about 5 and about 1000 parts by weight of sulfur dioxide per million parts of reaction mixture and recovering a product containing a phenol.

3. Process as defined in claim 2, wherein the hydroperoxide is diisopropyl benzene mono alpha-hydroperoxide.

4. Process as defined in claim 2 wherein the hydroperoxide is cumene hydroperoxide.

5. Process as defined in claim 4 wherein the cumene hydroperoxide contains suspended soda ash and the reaction temperatures are above room temperature.

6. A process for decomposing cumene hydroperoxide which comprises forming a liquid reaction mixture in which cumene hydroperoxide and sulfur dioxide are dissolved, the sulfur dioxide being in amounts between about 5 and about 1000 parts by weight per million parts by weight of reaction mixture; withdrawing reaction mixture when decomposition of cumene hydroperoxide is substantially complete; and recovering a product containing a phenol.

7. Decomposition process as defined in claim 6, wherein the reaction mixture is formed by adding cumene hydroperoxide and sulfur dioxide to a reaction medium of decomposition products and inerts from previous operation of said decomposition process at a rate maintaining reaction temperatures in the range between about 30° C. and about 80° C., and acetone and phenol are recovered as reaction products.

GEORGE G. JORIS.

REFERENCES CITED

The following references are of record in the file of this patent:

FOREIGN PATENTS

| Number | Country | Date |
|---|---|---|
| 626,095 | Great Britain | July 8, 1949 |

OTHER REFERENCES

Hock et al., Berichte, vol. 77, pages 257–64 (1944).